US005308388A

United States Patent [19]

Schell

[11] Patent Number: 5,308,388

[45] Date of Patent: May 3, 1994

[54] FOUNTAIN SOLUTION FOR OFFSET PRINTING

[75] Inventor: Loni Schell, Hofheim-Wallau, Fed. Rep. of Germany

[73] Assignee: Hoechst Aktiengesellschaft, Frankfurt am Main, Fed. Rep. of Germany

[21] Appl. No.: 950,239

[22] Filed: Sep. 24, 1992

Related U.S. Application Data

[63] Continuation-in-part of Ser. No. 694,250, May 1, 1991, abandoned.

[30] Foreign Application Priority Data

May 10, 1990 [DE] Fed. Rep. of Germany ....... 4014960

[51] Int. Cl.[5] .............................................. C09K 3/18

[52] U.S. Cl. ......................................... 106/2; 101/451

[58] Field of Search ............................ 106/2; 101/451

[56] References Cited

U.S. PATENT DOCUMENTS

| | | | |
|---|---|---|---|
| 4,374,036 | 2/1983 | Canale et al. | 252/135 |
| 4,854,969 | 8/1989 | Bassemir et al. | 106/2 |
| 4,968,584 | 11/1990 | Nagashima et al. | 430/309 |
| 5,064,749 | 11/1991 | Matsumoto et al. | 106/2 |
| 5,106,414 | 4/1992 | Kunichika et al. | 106/2 |
| 5,163,999 | 11/1992 | Uchida et al. | 106/2 |
| 5,165,344 | 11/1992 | Matsumoto et al. | 106/2 |

FOREIGN PATENT DOCUMENTS 336673 10/1989 European Pat. Off. .

OTHER PUBLICATIONS

"McCutcheon's Detergents & Emulsifiers", 1972 Annual, pp. 134–135.

*Primary Examiner*—Helene Klemanski
*Attorney, Agent, or Firm*—Foley & Lardner

[57] ABSTRACT

A fountain solution and a fountain solution concentrate for use in offset printing are disclosed. The ready-to-use solution comprises 0.001 to 0.08% by weight of at least one alkanol or alkenol or of an alkanediol or alkenediol having 5 to 15 carbon atoms, which has been converted with ethylene oxide and/or propylene oxide into polyether structures having 3 to 12 ethylene oxide units and/or propylene oxide units.

14 Claims, No Drawings

FOUNTAIN SOLUTION FOR OFFSET PRINTING

Background of the Invention

This application is a continuation-in-part of U.S. Ser. No. 07/694,250, filed May 1, 1991 now abandoned.

The present invention relates to a fountain solution and a fountain solution concentrate for use in offset printing.

In offset printing, plates and foils of metal, usually of aluminum, or of paper or synthetics, which have a hydrophilic surface in the non-printing areas and an oleophilic layer in the image areas or printing areas, are clamped to a printing cylinder. The hydrophilic and oleophilic areas are located in one plane, in a process known as planographic printing. For printing, in addition to the ink, which is oil-based, a so-called fountain solution is required which maintains the image-free areas hydrophilic, so that the ink is accepted only by the oleophilic image areas and transferred via the rubber blanket to the paper.

In the simplest case, water or dilute acid can be used as the fountain solution. In this case, however, it is difficult to maintain the ink/water balance. Difficulties arise on printing, for example, by ink being transferred to the non-image areas, a phenomenon known as scumming, or by the paper being over-moistened, which results in consequential damage such as press stops, poor drying and waviness of the printing paper.

To improve printing, substances are usually added to the fountain solution which are intended, for example, to optimize the pH and the compatibility with the printing ink and to counteract interference which can be caused by the regionally differing water, the paper or by microorganisms.

In addition to buffer mixtures which are intended to regulate the pH, additives for keeping the printing plate moist are especially used. In addition, chelate formers, organic solvents, preservatives, occasionally surfactants, corrosion inhibitors and antifoams are used.

Nowadays, isopropanol in a concentration from 8 to 20% by volume is widely added to the fountain solution. This addition effects a lowering of the surface tension and a reduction in water transfer. The results are a more brilliant printed image and less thorough moistening of the printed paper. The advantages of the use of isopropanol are to be compared with the following disadvantages:

- ready evaporation and ignitability of the isopropanol used for dilution,
- pollution of the breathing air, and
- high costs caused by the large quantity required in use.

Attempts have therefore been made to replace isopropanol.

In U.S. 3,877,372, the use of an isopropanol-free solution comprising ethylene glycol monobutylether, hexylene glycol and/or ethylene glycol in conjunction with a silicone/glycol copolymer and an antifoam is described. However, ethylene glycol monobutylether is not toxicologically safe.

U.S. Pat. No. 4,234,443 discloses a powder which is to be used in aqueous solution as a fountain solution. It is prepared from phosphate, metasilicate, tetrapotassium pyrophosphate and dialkylpoly-siloxane, as well as reaction products of alkylphenol or aliphatic alcohols with ethylene oxide in a molar ratio of 1:9 to 1:50. However, the aqueous solution of this powder shows an alkaline reaction, a property which can adversely affect the positive printing plate layers which are alkali-soluble under the action of light. A fountain solution working in the alkaline pH range requires more isopropanol or an appropriate substitute, in order to maintain the water absorption within a range favorable for printing (Braun, American Ink Maker, 1985, FIG. 16). A further disadvantage of the powder described is that reaction products of alkylphenol with ethylene oxide are not adequately biodegradable.

EP 336,673 describes a fountain solution for offset printing which, in addition to other surface-active agents such as anionic or nonionic agents, contains 0.1 to 5% by weight of a monohydric alcohol or diol of alkanes or alkenes, to which 1 to 10 mol of ethylene oxide and/or propylene diol per mol have been added. A preferred embodiment of this fountain solution comprises not less than 1% by weight of the surface-active agent. The disadvantage of this fountain solution is that the surface-active agent in the disclosed quantity cannot be incorporated into a concentrate. Solutions more concentrated than the ready-to-use solution exhibit undesirable effects, such as phase separation. Therefore, either a relatively expensive two-stage preparation method must be applied by the user, or ready-to-use solutions, i.e., solutions which have already been diluted to the end concentration, must be marketed, and this means transporting a hundred times the quantity.

U.S. Pat. No. 4,374,036 describes a neutral fountain solution comprising phosphate, pyrophosphate, a sequestrant, a water-soluble polyethylene glycol, sodium carboxymethyl cellulose, a nonionic and an anionic detergent. The nonionic detergent may be an ethoxylated alkylphenol or an ethoxylated aliphatic alcohol.

A fountain solution that preferably has a PH of from 3.5 to 5.5 and that comprises a nonionic surfactant having a hydrophilic balance (HLB) of from 1 to 8 and one or more hydrotropes is disclosed in U.S. Pat. No. 4,854,969. The surfactant is preferably a block copolymer of propylene oxide and ethylene oxide, but may also be an ethoxylated alkylphenol or an ethoxylated acetylenic glycol. The amount of surfactant in the fountain solution is relatively high, ranging from 0.05 to 20% by weight. The hydrotrope is necessary to increase the solubility of the surfactant which shows a relatively poor solubility in water. The reference indicates that addition of the hydrotrope is necessary to prevent precipitation.

SUMMARY OF THE INVENTION

It is therefore an object of the present invention to provide a fountain solution which is marketed as a liquid concentrate and is diluted merely by addition of water to give a ready-to-use fountain solution, which does not require isopropanol or a hydrotrope as a further additive, and in which the application values, with respect to surface tension and water consumption, are not inferior as compared with the state of the art.

It is a further object of the invention to provide a fountain solution containing a surfactant that is sufficiently soluble in water so that it does not require additional components in order to increase its aqueous solubility and enable the production of a concentrate of the fountain solution without formation of a precipitate.

It is yet another object of the invention to provide an acidic fountain solution that is isopropanol-free and hydrotrope-free.

These and other objects according to the invention are provided by a fountain solution for offset printing consisting essentially of water, about 0. 001 to 0. 08% by weight of at least one polyether surfactant selected from the group consisting of ethoxylated and propoxylated alkanols, alkenols, alkanediols and alkenediols having 5 to 15 carbon atoms, the polyether surfactant having 3 to 12 units selected from the group consisting of ethylene oxide units and propylene oxide units and having an HLB value of more than 8, and at least one pH-adjusting compound selected from the group consisting of an organic acid, a salt of an organic acid and a buffer, said pH-adjusting compound being present in an amount sufficient to produce a pH of between about 4 and 6 in the fountain solution.

A fountain solution concentrate is also provided, which can be diluted with water to produce a ready-to-use fountain solution. It comprises water containing the polyether surfactant in a concentration that is 30 to 100 times, preferably 40 to 70 times, the concentration of a ready-to-use fountain solution. The concentrate preferably comprises water containing from about 0.03 to 8% by weight, preferably about 0.04 to 5.6% by weight, more preferably about 0.07 to 3.2% by weight of the polyether. In the most preferred embodiment, the concentrate comprises about 0.1 to 2.4% by weight of the polyether.

A method of preparing a fountain solution is also provided according to the invention, which comprises the steps of providing a fountain solution concentrate; and diluting the fountain solution concentrate with an amount of water that is 30 to 100 times, preferably 40 to 70 times, the amount of water contained in the concentrate.

other objects, features and advantages of the present invention will become apparent from the following detailed description. It should be understood, however, that the detailed description and the specific examples, while indicating preferred embodiments of the invention, are given by way of illustration only, since various changes and modif ications within the spirit and scope of the invention will become apparent to those skilled in the art from this detailed description.

DETAILED DESCRIPTION OF THE PREFERRED EMBODIMENTS

According to the present invention, a ready-to-use fountain solution comprises about 0.001 to 0.08% by weight, preferably about 0.003 to 0.05% by weight, of at least one alkanol or alkenol or of an alkanediol or alkenediol having 5 to 15 carbon atoms, which has been converted into a polyether structure having 3 to 12, especially 6 to 8, ethylene oxide units and/or propylene oxide units.

It is entirely unexpected that the polyether surf actant according to the invention can be used in a composition consisting essentially of water and the polyether compound, i.e., without the addition of isopropanol or other alcohols or alcohol substitutes to improve the surface tension and without the addition of a hydrotrope to assist solubilization as in U.S. Pat. No. 4,854,969. The polyether surfactants have an HLB value of more than 8, preferably of more than 9, and even more preferably at least about 12, making them readily soluble in water. A hydrotrope is not required to increase the solubility.

Surprisingly, the low concentration of surfactant according to the invention causes a surface tension of about 30 to 45 mN/m in the fountain solution, even in the absence of isopropanol or other alcohols or alcohol substitutes. It is completely surprising that the fountain solution according to the invention, as compared with fountain solutions according to EP 336,673, shows comparable values with regard to the surface tension, in spite of the lower concentration of the surfactant, and at the same time displays substantially better values in water absorption of the ink and better behavior on the printing press in the scum cycle test. The lower concentration of the ready-to-use solution means that the fountain solution can be marketed and transported in a concentrated form, and then diluted by the user.

Both straight-chain and branched alkanols and alkenols or alkanediols and alkenediols can be used. Preferred compounds include n-pentanol, 2-methylbutanol, 1-penten-3-ol, 1-hexanol, 3-hexanol, 4-methyl-2-pentanol, 2-ethylbutanol, 5-hexen-1-ol, 1-heptanol, heptenol, n-octanol, 1-octen-3-ol, 2-ethylhexanol, nonanol, 2,6-dimethyl-4-heptanol, n-decanol, decenol, sec.-undecanol, substituted and unsubstituted cyclohexanol, 1,5-pentanediol, 2,4-pentanediol, 2,5-hexanediol, 1,6-hexanediol, 1,7-heptanediol, 2,4-heptanediol, 2-methyl-2,4-pentanediol, 2-ethyl-1,3-hexanediol,1,8-octanediol, 1,9-nonanediol, 1,10-decanediol, cyclopentane-1,2-diol, cyclohexane-1, 2-diol, dodecanol and dodecenol. Alkanols and alkanediols are particularly preferred and, among these, alkanols having 10 to 15 carbon atoms are especially preferred.

The surfactants according to the invention contain polyether structures having 3 to 12 ethylene oxide units and/or propylene oxide units. These surfactants are prepared by adding 3 to 12 and especially 6 to 8 mol units of ethylene oxide and/or propylene oxide per mol of alcohol. When both ethylene oxide and propylene oxide are to be reacted with the alcohol, they are preferably employed in an equimolar ratio. In this case, the mole fraction of the individual components is 3 to 6 mol.

Examples of suitable surfactants according to the present invention include a polyether formed by comprising $C_5$-alkanol and 3 units of ethylene oxide, a polyether comprising $C_5$-alkanol and 12 units of ethylene oxide and a polyether comprising $C_{15}$-alkanol and 12 units of ethylene oxide. These polyethers have HLB values of 12.9, 17.6 and 14.2, respectively.

It is also possible to use mixtures of two or more surfactants in the fountain solution according to the invention. In some cases, it is advantageous additionally to use cationic surfactants. Furthermore, the fountain solution according to the invention can contain small quantities of solvents of low volatility having a boiling point above about 1OO° C. and a flash point above about 21 C., which favorably affect the water absorption in the ink, for example, methylpyrrolidone, glycol ethers, alcohols or lactones.

As protective film-formers and viscosity control agents, the f ountain solution can contain conventional water-soluble polymers such as polyglycols, polyacrylic compounds such as polyacrylamides, polyacrylic acid and copolymers thereof , polyvinyl alcohols and derivatives thereof. polyvinylpyrrolidone, gum arabic, starch, dextrine and cellulose ethers. In the ready-to-use fountain solution. the water-soluble polymers are present in concentrations from about 0.001 to 5% by weight, preferably about 0.005 to 1% by weight.

To adjust the pH range in the fountain solution according to the invention to 4 to 6, especially to about 5, organic acids and/or salts thereof and other usual buffer mixtures are used. Citric acid, acetic acid, oxalic acid, malonic acid, p-toluenesulfonic acid, tartaric acid, maleic acid and the like may be mentioned as organic acids. If the acids are used as such, the desired pH is adjusted to the range indicated above by an addition of alkali, especially NAOH, or by addition of phosphates, especially trisodium phosphate.

The fountain solution according to the invention can also contain humectants, which form a moisture film on the plate and thus ensure rapid remoistening after a press stop. These include, in particular, glycerol, sugar alcohols, ethylene glycol, propylene glycol, butylene glycol, pentanediol, hexanediol, diethylene glycol, triethylene glycol, tetraethylene glycol, dipropylene glycol and/or tripropylene glycol. The compounds can be present in the f ountain solution in a concentration of pref erably up to about 1% by weight.

Chelate formers can also be added to the fountain solution. organic amines are particularly preferred. However, their presence in the fountain solution is not essential to the invention. Usually, the fountain solution can contain chelate formers in concentrations from about 0.001 to 0.5% by weight, preferably about 0.01 to 0.2% by weight.

Other conventional additives include preservatives such as the biocides ®Mycostabil (Druckservice Heliocolor), ®Piror P 840 (Gockel & Co. GmbH, Munich) or ®GFML (made by Riedel de Haen, Seelze) for prevention of the growth of fungi. bacteria and algae. Dyes and antifoams can also be added.

To obtain a ready-to-use fountain solution, the constituents in the indicated quantities are made up with water to 100% by weight. The total hardness of the water can here range from 1 to 400, and especially from 8 to 250 German hardness. The carbonate hardness of the added water is especially 3 to 200 German hardness.

The fountain solution concentrate contains the particular constituents in concentrations which correspond to about 30 to 100 times and preferably about 40 to 70 times the values indicated in the present description. This concentrate is then diluted by the user with water of the quality indicated above to give the ready-to-use fountain solution.

The examples which follow are intended to explain the invention in more detail, without having a restricting effect. In these examples, the g:cM$^3$ ratio is 1:1, unless otherwise stated. P.b.w. means part(s) by weight, and p.b.v. means part(s) by volume.

In the examples, the particular fountain solution is tested by reference to several measured parameters. The surface tension (detachment method) provides information on the extent of the effect of the surfactant.

The water consumption on the printing press also provides information on the property of the surfactant. With optimum effectiveness, the least possible water is transferred to the paper, and consequently the consumption is reduced.

The scum cycle test provides information on the cleaning action of the fountain solution. In this test, the water supplied during printing is turned of f and printing is continued until the plate has been blocked with ink. Water is then added again and the number of sheets is determined, after which the print is again perfectly clean. This is a relative comparison.

The water absorption test is carried out in accordance with "Surland, TAGA PROCEEDINGS, 1983" and provides numerical information on the printing behavior. The data are reliable only if the same ink is used. In the present examples, the LITHO-SET-SE black ink No. 50-940100-6 from Sieqwerk is used. This again is a relative comparison. If other inks are used, all the values can be lower or higher

EXAMPLE 1

An electrolytically-roughened and anodized aluminum foil is coated with a solution of:

2.17 p.b.w. of 4-(a,a-dimethylbenzyl)-phenyl 1,2-naphthoquinone-diazide-4-sulfonate,
1.02 p.b.w. of the esterification product of 1 mol of 2,21-dihydroxy-1,11-dinaphthylmethane and 2 mol of 1,2-naphthoquinone-diazide-5-sulfochloride,
0.37 p.b.w. of 1,2-naphthoquinone-diazide-4-sulfochloride,
0.10 p.b.w. of crystal violet and
9.90 p.b.w. of a cresol/formaldehyde novolak having a softening range from 112 to 118° C. in
43 p.b.v. of tetrahydrofuran,
35 p.b.v. of ethylene glycol monomethyl ether, and
9 p.b.v. of butyl acetate and dried. The light-sensitive material obtained is exposed under a photographic, positive original which, inter alia, contains a 21-step step wedge with density increments of 0.15. The exposure time is selected such that step 9 is fully covered. The plate is developed with a 5% aqueous sodium metasilicate solution, rinsed well, fixed with acid and used for printing in a Heidelberger GTO-VP printing press with an alcohol fountain unit. The printing ink used is K+E black 185 W (BASF).

The fountain solution used is a mixture of 0.004 p.b.w. of ethoxylated decyl alcohol having 7 ethylene oxide units,
0.002 p.b.w. of an ethoxylated and propoxylated $C_{10}/C_{12}$-alcohol (4 ethoxy units and 4 propoxy units),
0.002 p. b. w. of dialkyldimethylammonium chloride (alkyl <10 carbon atoms),
0.16 p.b.w. of citric acid,
0.2 p.b.w. of dipropylene glycol.
0.06 p.b.w. of N-methylpyrrolidone,
0.06 p.b.w. of preservative, and
sufficient NAOH to adjust the pH to 5.0 and
sufficient water of a total hardness of 17 0 German hardness and a carbonate hardness of 110 German hardness to make up the f ountain solution to 100 parts by weight.

The surface tension is determined to be 36 mN/m, the water consumption is determined to be 69% (Comparison Example 14) as compared with a conventional fountain solution with 20% added isopropanol as 100%, the sheet number up to clean running (scum cycle test) is determined to be 120 sheets and the water absorption is determined to be 38%.

EXAMPLES 2 TO 9

The following fountain solutions are used for printing from a printing plate made up according to Example 1. The fountain solution compositions and results are compiled in Table 1.

TABLE 1

| Example No. (Data in parts by weight) | 2 | 3 | 4 | 5 | 6 | 7 | 8 | 9 |
|---|---|---|---|---|---|---|---|---|
| Ethoxylated decyl alcohol (7 EO) | 0.004 | 0.002 | — | — | 0.008 | — | 0.0015 | 0.037 |
| Ethoxylated dodecyl alcohol (8 EO) | — | 0.004 | — | 0.004 | — | 0.004 | — | — |
| Ethoxylated and propoxylated $C_{10}/C_{12}$-alcohol (4 EO + 4 PO) | 0.002 | — | 0.008 | — | — | — | 0.008 | 0.013 |
| Dialkylammonium chloride (C < 10) | 0.002 | — | — | — | — | — | 0.008 | 0.013 |
| Citric acid | 0.16 | 0.16 | 0.016 | 0.16 | 0.16 | 0.16 | 0.16 | 0.16 |
| Dipropylene glycol | 0.1 | 0.2 | — | — | 0.2 | 0.2 | 0.1 | 0.1 |
| N-Methylpyrrolidone | — | 0.06 | — | — | 0.06 | 0.06 | — | — |
| Adjusted with NaOH or trisodium phosphate to pH: Made up to 100 parts by weight with water of total hardness of 17° German hardness and carbonate hardness of 11° German hardness | 4.9 | 5.0 | 5.3 | 5.2 | 4.9 | 5.3 | 5.1 | 5.1 |
| Surface tension (detachment method) mN/m | 38 | 32 | 33 | 30 | 45 | 32 | 45 | 30 |
| Water consumption on the printing press as compared with Comparison Example 14 (= 100%) | 71% | 71% | — | — | 90% | 83% | — | — |
| Scum cycle test: clean running after number of sheets: | 110 | 100 | — | 100 | 120 | — | — | — |
| Water absorption (determined with black offset printing ink made by Siegwerk No. 50-940100-6) | 36% | 39% | 37% | 43% | 38% | 38% | 38% | 40% |

EXAMPLE 10

The procedure followed is as in Example 1. The fountain solution used is a solution prepared from:

0.02 p.b.w. of ethoxylated decyl alcohol,
0.16 p.b.w. of citric acid,
0.06 p.b.w. of Piror P 840,
0.3 p.b.w. of dipropylene glycol,
0.06 p.b.w. of N-methylpyrrolidone, and
0.02 p.b.w. of polyglycol 600 by dissolution in deionized water, so that 100 parts by weight result after adjustment of the pH to 5.

The solution has a surface tension of 39.5 mN/m. Perfect prints are obtained in the printing press. As compared with Comparison Example 14, the water consumption is reduced. The water absorption of the LITHO-SET-SE black printing ink no. 50-940 100-6 is reduced to 33% as compared with Comparison Example 13, a representative of isopropanol-containing fountain solutions, whereby a brilliant print with well-covered full tones is produced.

COMPARISON EXAMPLE 11

The procedure followed is as in Example 1, with the exception that a surfactant is omitted. A value of 65 mN/m is determined for the surface tension. The water consumption on the printing press as compared with Example 14 is 100%, i.e., the water consumption cannot be reduced with a fountain solution without surfactant. The scum cycle test gives a sheet number of 150, after which perfect prints can again be obtained. The water absorption is greater than 45%. This clearly demonstrates the improvement due to the surfactants according to the invention.

COMPARISON EXAMPLE 12

The procedure followed is the same as in Example 1, but with the proviso that, in place of 0.004 part by weight of the ethoxylated decyl alcohol (7 EO) used therein, 1.0 part by weight is employed in accordance with EP 336,673.

As a result, a surface tension of 27 mN/m is obtained, a value which is not significantly lower than that in Example 1, in which a surfactant quantity smaller by powers of 10 is employed. The water consumption was not determined, since the image was still not clean after 100 prints; there was very pronounced scumming, i.e., no useful print was obtained. The same phenomenon is found in the scum cycle test; scumming is still present even after consumption of more than 150 sheets.

COMPARISON EXAMPLE 13

In this example, the fountain solution used is a mixture of 10 parts by weight of isopropanol, 0.16 part by weight of citric acid and 0.02 part by weight of polyglycol 600. The solution is made up to 100 parts by weight with water of a total hardness of 17° Cerman hardness and a carbonate hardness of 11° German hardness and adjusted with NaOH to pH 5.0.

This solution has a surface tension of 36.5 mN/m. The LITHO-SET-SE black printing ink made by Siegwerk absorbs 37% of this fountain solution. The fountain solution according to the invention has properties comparable with those of isopropanol but, in addition, also has the advantages described.

COMPARISON EXAMPLE 14

In this example, the fountain solution used is a mixture of 20 parts by weight of isopropanol, 0.16 part by weight of citric acid and 0.15 part by weight of glycerol. The solution is made up to 100 parts by weight with water of a total hardness of 30° German hardness and a carbonate hardness of 14° German hardness and adjusted with NAOH to pH 5.0.

This fountain solution serves as a reference example with isopropanol for the printing tests on the Heidelberger GTO-VP. The water consumption is set equal to 100%. The number of sheets up to clean running is 100. With respect to the water consumption, this example shows disadvantages as compared with those according to the invention.

COMPARISON EXAMPLE 15

The procedure used to prepare the printing plate is the same as described in Example 1.

The fountain solution used was a mixture of:

0.04 p.b.w. of ethoxylated nonylphenol
0.016 p.b.w. of citric acid,
0.06 p.b.w. of preservative, and
sufficient NAOH to adjust the pH to 5.3, and
sufficient water of a total hardness of 170 German hardness and a carbonate hardness of 11° German hardness to make up the fountain solution to 100 parts by weight.

The water absorption was determined to be an unacceptable 48%.

What is claimed is:

1. A fountain solution for offset printing consisting essentially of:

water;

about 0.001 to 0.08% by weight of at least one polyether surfactant selected from the group consisting of $C_5$–$C_{15}$-alkanols, $C_5$–$C_{15}$-alkenols, $C_5$–$C_{15}$-alkanediols and $C_5$–$C_{15}$-alkenediols which have been ethoxylated or propoxylated, the polyether surfactant having 3 to 12 units selected from the group consisting of ethylene oxide units and propylene oxide units and having an HLB value of more than 8;

at least one pH-adjusting substance selected from the group consisting of an organic acid, a salt of an organic acid and a buffer, said pH-adjusting compound being present in an amount sufficient to produce a pH of between 4 and 6 in the fountain solution; and optionally at least one additive selected from the group consisting of water-soluble organic solvents having a boiling point above about 100° C. and a flash point above about 21° C., humectants, water-soluble polyers, corrosion inhibitors, chelate formers, preservatives, dyes and antifoams wherein said fountain solution is hydrotrope-free.

2. A fountain solution as claimed in claim 1, comprising 0.003 to 0.05% by weight of said polyether surfactant.

3. A fountain solution as claimed in claim 1, wherein the polyether surfactant contains 6 to 8 units of at least one of ethylene oxide and propylene oxide.

4. A fountain solution as claimed in claim 1, additionally consisting essentially of a water-soluble organic solvent having a boiling point above about 100° C. and a flash point above about 21° C.

5. A fountain solution as claimed in claim 4, wherein the organic solvent is present in a concentration of about 0.005 to 0.7% by weight in the fountain solution.

6. A fountain solution as claimed in claim 4, wherein the organic solvent is present in a concentration of about 0.01 to 0.3% by weight in the fountain solution.

7. A fountain solution as claimed in claim 1, additionally consisting essentially of a humectant in a concentration of up to about 1% by weight.

8. A fountain soltuion as claimed in claim 1, additionally consisting essentially of at least one additive selected from the group consisting of water-soluble polymers, corrosion inhibitors, chelate formers, preservatives, dyes and antifoams.

9. A fountain solution as claimed in claim 1, wherein the polyether surfactant has an HLB value of more than 9.

10. A fountain solution as claimed in claim 1, wherein the polyether surfactant has an HLB value of at least 12.

11. A method for the production of a ready-to-use fountain solution, comprising the steps of:

providing a fountain concentrate containing about 0.03 to 8% by weight of a polyether surfactant selected from the group consisting of $C_5$–$C_{15}$-alkanols, $C_5$–$C_{15}$-alkenols, $C_5$–$C_{15}$-alkanediols and $C_5$–$C_{15}$-alkenediols which have been ethoxylated or propoxylated, the polyether surfactant having 3 to 12 units selected from the group consisting of ethylene oxide units and propylene oxide units and having an HLB value of more than 8; and diluting the fountain concentrate with water to produce a ready-to-use fountain solution as claimed in claim 1.

12. A method as claimed in claim 11, wherein the fountain solution concentrate comprises water containing about 0.04 to 5.6% by weight of the polyether surfactant.

13. A method as claimed in claim 11, wherein the fountain solution concentrate comprises water containing about 0.07 to 3.2% by weight of the polyether surfactant.

14. A method as claimed in claim 11, wherein the fountain solution concentrate comprises water containing about 0.1 to 2.4% by weight of the polyether surfactant.

* * * * *